United States Patent [19]

Khalighi et al.

[11] Patent Number: 4,827,883
[45] Date of Patent: May 9, 1989

[54] VARIABLE SWIRL INLET PORT

[75] Inventors: Bahram Khalighi, Troy; Rodney B. Rask, Grosse Pointe Woods, both of Mich.

[73] Assignee: General Motors Corporation, Detroit, Mich.

[21] Appl. No.: 181,895

[22] Filed: Apr. 15, 1988

[51] Int. Cl.$^4$ .............................................. F02B 31/00
[52] U.S. Cl. .............................. 123/308; 123/52 MB; 123/188 M
[58] Field of Search .............. 123/308, 188 M, 52 MB

[56] References Cited

U.S. PATENT DOCUMENTS

| | | | |
|---|---|---|---|
| 4,462,349 | 7/1984 | Motosugi et al. | 123/308 |
| 4,465,035 | 8/1984 | Carr | 123/52 MB |
| 4,481,922 | 11/1984 | Sugiura | 123/308 |
| 4,574,748 | 3/1986 | Inoue et al. | 123/52 MB |
| 4,700,669 | 10/1987 | Sakurai et al. | 123/188 M |

FOREIGN PATENT DOCUMENTS 1576012 12/1967 Fed. Rep. of Germany.
0060523 3/1947 Netherlands.

Primary Examiner—E. Rollins Cross
Attorney, Agent, or Firm—Robert J. Outland

[57] ABSTRACT

An engine with a cylinder inlet port controlled by a poppet valve has a flow directing vane on a shaft aligned with the valve stem upstream in the direction of flow. The vane is movable between a position aligned with the valve stem in which free flow is allowed and an angled position of less than 90° to one side of the port whereby maximum charge swirl is obtained in the cylinder.

11 Claims, 3 Drawing Sheets

VARIABLE SWIRL INLET PORT

TECHNICAL FIELD

This invention relates to internal combustion engines and, more particularly, to reciprocating piston engines having swirl generating cylinder inlet ports

BACKGROUND

It is known in the art relating to internal combustion engines to generate air swirl in the cylinders to provide enhanced combustion characteristics. Commonly used fixed geometry swirl generating inlet ports may produce the desired swirl intensity to promote combustion at part load, but they generally reduce the engine volumetric efficiency at wide open throttle and thus limit the maximum charge volume and thereby the maximum output of the engine.

Some variable geometry swirl generating ports have been proposed having various forms of vanes or other devices to vary the port configuration. However, in at least some cases, the resulting port configurations and the added valves, vanes or the like have not provided the desired combination of swirl generation at part throttle while allowing free breathing at wide open throttle and high engine speeds.

SUMMARY OF THE INVENTION

The present invention provides variable swirl inlet ports developed to satisfy the dual requirements of developing sufficient part load swirl to improve combustion while maintaining high volumetric efficiency, or free breathing, at full load, wide open throttle conditions. A variable swirl port according to the invention utilizes a free-flowing open port passage designed with a minimum restriction of flow to the associated inlet valve so as to provide free breathing at wide open throttle. In the passage, there is provided a variable position flow directing vane which extends in an upstream direction from a shaft, extending through the port and lying on an imaginary divider formed by projecting the central port axis in a direction parallel with the stem of the associated inlet valve. The vane and shaft are thus arranged in alignment with the inlet valve stem during wide open throttle operation so as to provide a minimum restriction to flow and maintain high volumetric efficiency at full load.

At part throttle or lower speed operation, the shaft is oscillated to pivot the flow directing vane toward one side of the passage to a selected angle at which air flow is directed toward the other side of the inlet port and swirl generation is provided. A maximum vane angle of less than 90° at or near engagement of the vane with the port wall is preferred to obtain maximum cylinder swirl.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
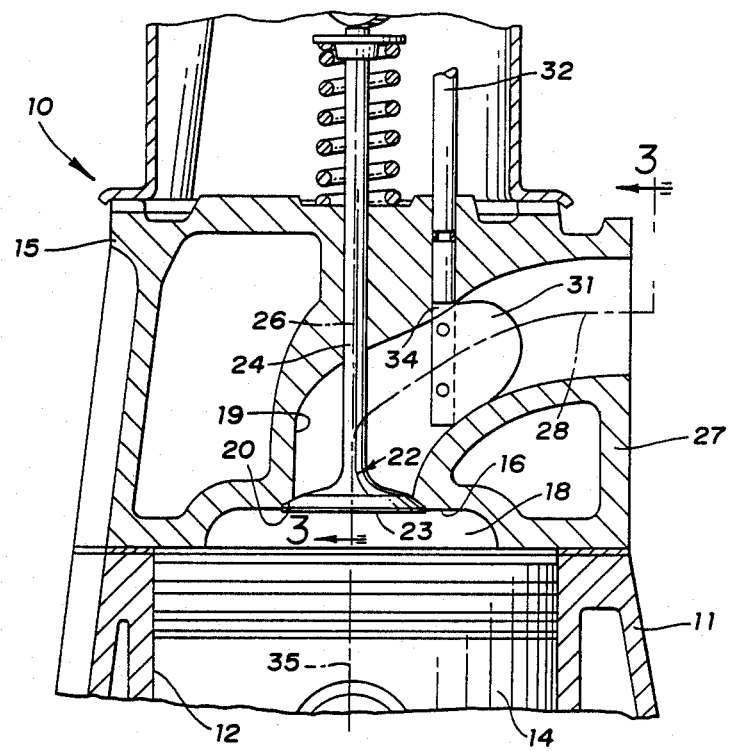
FIG. 1 is a transverse cross-sectional view of an internal combustion engine showing a variable intake port arrangement in accordance with the present invention.

Referring now to the drawings in detail, numeral 10 generally indicates an internal combustion engine having cylinder block 11 defining a plurality of cylinders 12 each fitted with a reciprocating piston 14 and only one of which is shown.

A cylinder head 15 mounted on block 11 includes lower wall 16 which closes the cylinder ends to conventionally define variable volume combustion chambers 18.

Opening through the end wall 16 of each cylinder, the cylinder head defines an inlet port 19 having a valve seat 20 surrounding the port opening at the end wall. Communication of the port with the combustion chamber is controlled by a poppet valve 22 having a head 23 that is seatable on the valve seat and a stem 24 carried in the cylinder head and extending upwardly from the valve head on an axis 26. The inlet port 19 includes a passage portion that extends within the cylinder head upwardly and to one side of the valve axis, opening through a side wall 27 of the cylinder head on which a manifold, not shown, may be mounted in conventional manner.

Figure 2:
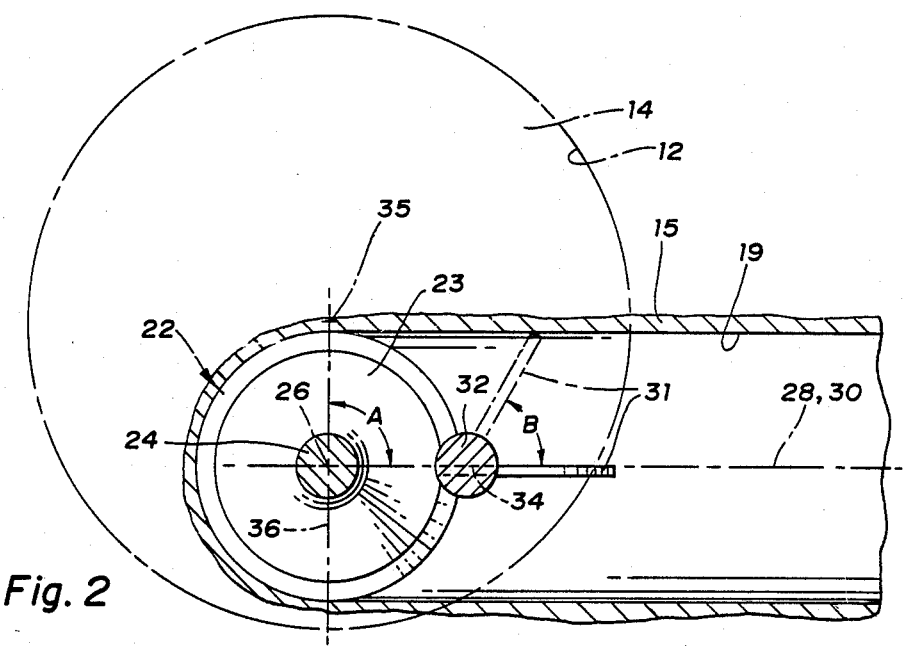
FIG. 2 is a top view partially in section illustrating the intake port and valve arrangement of FIG. 1.

The inlet port 19 is centered on an axis 28 which intersects the valve axis and may be projected parallel therewith to form an imaginary port divider 30. The port divider forms a plane which intersects the valve axis and may be flat, as shown in FIG. 2, wherein the port is straight as viewed from the top. Alternatively, the port and port divider may be curved as desired for a particular engine application.

Within the inlet port 19 there is carried a flow directing vane 31 which is secured to and extends in an upstream direction from an oscillatable shaft 32. The shaft 32 lies parallel with the valve stem and along the imaginary port divider 30 so as to be aligned in the direction of flow with the valve stem.

Figure 4:
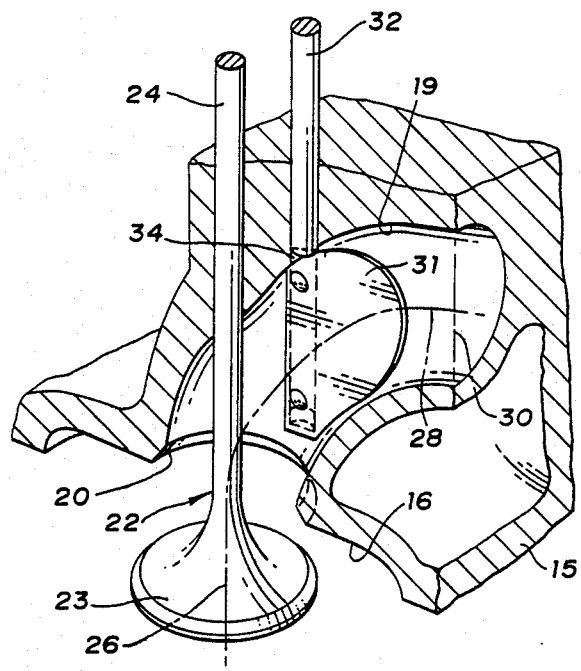
FIG. 4 is a pictorial cross-sectional view through the intake port showing the flow directing vane in a non-swirl high flow position.

The vane 31 is preferably attached to a flattened portion 34 of the shaft so that, in its centered position as shown in FIG. 4, and in solid lines in FIG. 2, the vane 31 lies along the port divider in alignment with the valve stem and the associated shaft. In this position, inlet air or mixture flow through the port into the cylinder is essentially undisturbed by the flow directing vane and shaft by virtue of its alignment with the valve stem. Thus, free breathing, or maximum volumetric efficiency, of the engine/port combination is assured.

Figure 3:
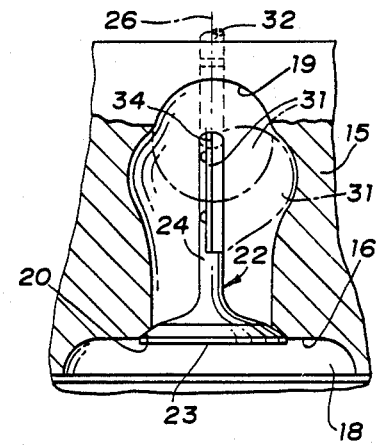
FIG. 3 is a cross-sectional view through the port generally in the plane indicated by the line 3—3 of FIG. 1.
Figure 5:
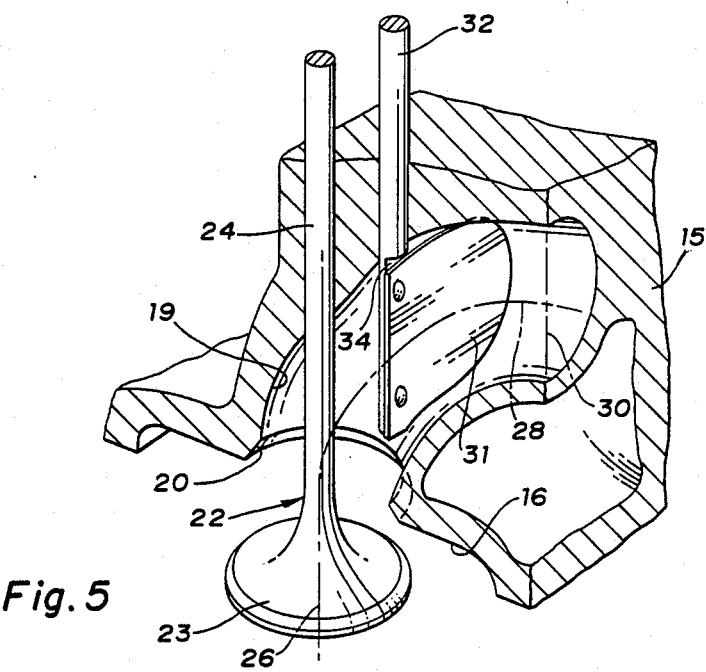
FIG. 5 is a pictorial view similar to FIG. 4 but showing the flow directing vane in a part throttle maximum swirl position.

To provide swirl under low load or part throttle conditions, the shaft 32 and the attached vane 31 may be oscillated in a counterclockwise direction, as shown in FIG. 2, to any desired position up to a maximum swirl position. In the maximum swirl position, the vane lies against, or close to, the port wall as shown in dashed lines in FIGS. 2 and 3 and in solid lines in FIG. 5. In this position, flow through the portion of the port toward the center of the associated cylinder is fully or partially blocked and the flow is directed toward the outer portion of the inlet port. Thus, the flow is caused to enter the cylinder near the cylinder wall in a direction largely tangential or parallel to the cylinder wall. This creates a maximum amount of swirl so as to improve combustion at part throttle or at low speed and load operating conditions.

As is best shown in FIG. 2, the inlet port 19 opens to the cylinder 12 generally to one side of the cylinder axis 35 and along a radius 36 with which the port axis 28 forms an angle A. Angle A is shown as being approximately 90° but it may have other values. Preferably the angle A lies within the range of from 75° to 135°. Some tests indicate that an angle of about 110° is ideal for maximum swirl generation in a port configuration similar to that shown in FIGS. 1-5. However, the invention is not intended to be so limited.

In similar fashion, the flow directing vane is adjustable from its aligned position lying along and at a zero angle with the port axis 28 and the imaginary port divider 30, defined thereby, to a maximum angle B with the port axis. In particular tests, it was indicated that an angle of about 70° was ideal for maximum swirl generation in a configuration similar to the embodiment of FIGS. 1-5; however, a range of from 65°-70° appears reasonable and a greater range may be suitable for other cylinder and port arrangements.

When the vane 31 is adjusted into its maximum angled position, it is preferably in engagement with or close to the side of the port so as to block most or all flow through the port inner side with respect to the cylinder axis. However, due to limitations on location and placement of the vane and its shaft, a certain amount of clearance may be required, providing less than complete blockage of flow but still resulting in satisfactory swirl generation.

While in the embodiment of FIGS. 1-5, the vane shaft is shown parallel to the inlet valve axis, it may be preferable, where possible, to mount the shaft in a manner such that it is normal to the port axis at its intersection therewith. In this way, the vane may most easily be shaped to provide complete blockage of the port when the vane is moved into its maximum angled position.

However, other considerations, such as the mounting location of the vane and the external mechanism required for actuating the vane, may mandate other angular positions. It is thus within the scope of the invention to locate the shaft 32 at any suitable angular position relative to the port axis and/or the valve axis which allows movement of the upstream directed vane in the port in a manner to block a substantial amount of flow on the inner side of the port relative to the cylinder axis.

Figure 6:
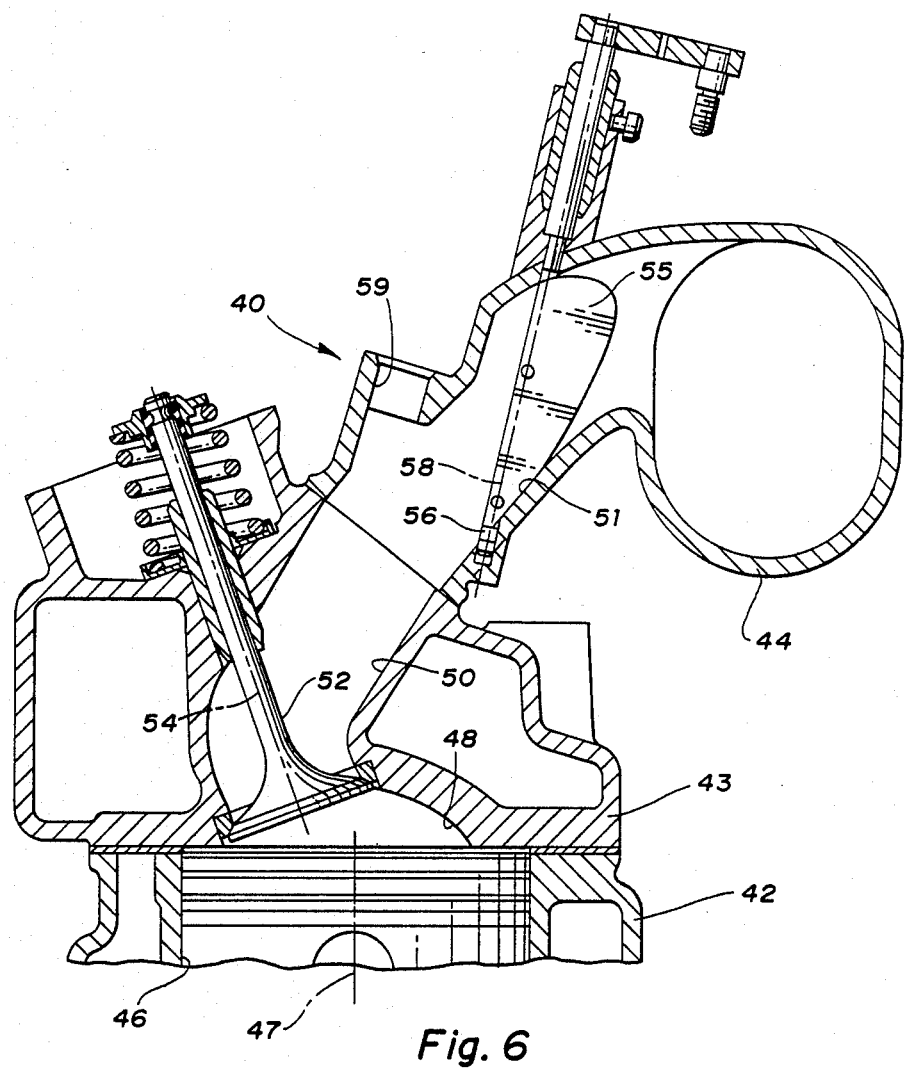
FIG. 6 is a transverse cross-sectional view of an alternative embodiment of internal combustion engine having a variable swirl inlet port and manifold mounted flow directing vane in accordance with the invention.

Referring now to FIG. 6, there is shown an alternative embodiment of engine 40 having a cylinder block 42, cylinder head 43 and associated intake manifold 44. The block defines a cylinder 46 having an axis 47 and closed by a wall 48 of the cylinder head.

An inlet port 50 extends from the wall 48 through the cylinder head and into a connecting runner 51 of the manifold 44. An intake valve 52, controlling the inlet port, is reciprocable on an axis 54 that is angled in one direction from the cylinder axis 47. A flow directing vane 55 is carried on a shaft 56 in the manifold runner portion of the port. For reasons of installation and operation, the shaft 56 extends on an axis 58 that is angled relative to the cylinder axis in a direction opposite from the valve axis. An opening 59 in the manifold runner downstream from the vane 55 provides access to the port for a fuel injector, not shown.

The embodiment of FIG. 6 differs from the previously described embodiment with regard to the location of the flow directing vane in the manifold runner, rather than the cylinder head, portion of the inlet port. It also differs in the angular positioning of the engine intake valve and the vane shaft. However, the arrangement is similar in that the shaft 56 is positioned on the port axis in alignment with an imaginary port divider, not shown, located on the port axis and passing through the shaft axis 58 and the valve axis 54. Thus, flow through the inlet port when the vane is aligned with the imaginary port divider (and the inlet valve stem) yields a minimum of interference with flow into the engine cylinder through the inlet port.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. An internal combustion engine comprising
   means defining a cylinder having a closed end,
   an inlet port opening through the closed end at an annular valve seat,
   a poppet valve having a reciprocable stem and a head engageable with the valve seat for closing the port, the port extending axially and laterally upstream from the valve seat to one side of the stem about a central port axis which, projected parallel to the valve stem, defines an imaginary central port divider, and
   a flow directing vane in the port upstream from the valve, the vane having a trailing edge fixed to and terminating at a shaft lying along said imaginary port divider at a substantial angle to the port axis and the shaft being oscillatable to vary the vane angle between a non flow-directing position lying along said divider directly upstream from the shaft and a maximum flow directing position at an angle of the vane from the divider of less than 90°.

2. An engine as in claim 1 wherein the maximum vane angle from the divider is between 65° and 75°.

3. An engine as in claim 2 wherein at its maximum vane angle the vane directs nearly all flow to the opposite side of the port.

4. An engine as in claim 1 wherein the shaft is parallel with the valve stem.

5. An internal combustion engine comprising
   means defining a cylinder centered on a cylinder axis and having a closed end,
   an inlet port opening through the closed end at an annular valve seat located at least primarily to one side of the cylinder axis,
   a poppet valve having a reciprocable stem and a head engageable with the valve seat for closing the port, the port extending axially and laterally upstream from the valve seat to one side of the stem about a central port axis which, projected parallel to the valve stem, defines an imaginary central port divider, the port axis intersecting the cylinder on a cylinder radius extending from the cylinder axis, and the port divider forming a port angle with said cylinder radius of from 75° to 135°, and a flow directing vane in the port upstream from the valve, the vane having a trailing edge fixed to and terminating at a shaft lying along said imaginary port divider at a substantial angle to the port axis and the shaft being oscillatable to vary the vane angle between a non flow-directing position of the vane lying along said divider directly upstream from the shaft and a maximum flow directing position of the vane at an angle of less than 90° from its upstream position along the divider.

6. An engine as in claim 5 wherein the maximum vane angle from the divider is between 65° and 75° and the said port angle is between 85° and 115°.

7. An engine as in claim 5 wherein the maximum vane angle from the divider is substantially 70° and the said port angle is substantially 110°.

8. An engine as in claim 7 wherein, at its maximum vane angle, the vane directs nearly all flow to the opposite side of the port.

9. An engine as in claim 5 wherein the shaft is parallel with the valve stem.

10. An engine as in claim 1 wherein the engine includes a manifold having a runner passage connecting with and comprising an extension of the port and the shaft and flow directing vane are carried in the manifold runner portion of the port.

11. An engine as in claim 1 wherein the engine includes a cylinder head defining the cylinder closed end and an adjacent portion of the port and the shaft and flow directing vane are carried in the cylinder head.

* * * * *